(12) United States Patent
Schelle et al.

(10) Patent No.: US 11,403,447 B1
(45) Date of Patent: Aug. 2, 2022

(54) RUNTIME INTELLECTUAL PROPERTY CORE METADATA TO REBUILD A NEXT-COMPILE-TIME INTELLECTUAL PROPERTY CORE

(71) Applicant: Xilinx, Inc., San Jose, CA (US)

(72) Inventors: Graham F. Schelle, Louisville, CO (US); Patrick Lysaght, Los Gatos, CA (US); Yun Qu, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/243,730

(22) Filed: Apr. 29, 2021

(51) Int. Cl.
*G06F 30/31* (2020.01)
*G06F 115/08* (2020.01)

(52) U.S. Cl.
CPC .......... *G06F 30/31* (2020.01); *G06F 2115/08* (2020.01)

(58) Field of Classification Search
CPC ....................................................... G06F 30/31
USPC ......................................................... 716/117
See application file for complete search history.

(56) References Cited

U.S. PATENT DOCUMENTS 10,474,610 B1 * 11/2019 Schelle ............... G06F 11/3466

OTHER PUBLICATIONS

PYNQ—Python productivity for Zynq—Home, Apr. 29, 2021, www.pynq.io, 2 pages.

* cited by examiner

*Primary Examiner* — Eric D Lee
(74) *Attorney, Agent, or Firm* — Kevin T. Cuenot

(57) ABSTRACT

Rebuilding a next compile-time Intellectual Property (IP) core can include determining an IP core included in a runtime design for an integrated circuit (IC) by evaluating metadata of the runtime design. The IP core specifies a circuit configured for implementation in programmable circuitry of the IC. Source code for the IP core may be retrieved automatically based on source data read from the metadata. A new instance of the IP core, including the source code, may be generated in a memory. The new instance of the IP core may be included within a new compile time design.

20 Claims, 6 Drawing Sheets

RUNTIME INTELLECTUAL PROPERTY CORE METADATA TO REBUILD A NEXT-COMPILE-TIME INTELLECTUAL PROPERTY CORE

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to rebuilding an Intellectual Property core based on a runtime design for an IC.

BACKGROUND

An "Intellectual Property Core" or "IP core" refers to a pre-designed and reusable unit of logic, cell, or chip layout design in the field of electronic circuit design. An IP core may be expressed as a data structure specifying a description of circuitry that performs a particular function. IP cores may be parameterizable in that a user may enter a collection of one or more parameters, referred to as a "parameterization," to activate or change certain functionality of an instance of an IP core. Accordingly, circuit designers may build designs for implementation in ICs that include one or more IP cores. Each instance of an IP core included in the design may have a different parameterization.

Initially, the design may be specified as one or more source files referred to as a compile time design. The source files, which may include high-level programming language code and/or hardware description language, are compiled through a design flow to generate a runtime design that includes configuration data for the IC. The configuration data, which may be specified as one or more binary encoded files, may be loaded into the IC to implement circuitry therein. Once processed through the design flow, many of the particular features, e.g., parameters, used to implement the various IP cores from the compile time design are not preserved as part of the runtime design. This means that were one to attempt to reimplement a particular IP core based on the runtime design, the implementation details of the IP core necessary for reimplementation would not be available.

SUMMARY

A method can include determining an Intellectual Property (IP) core included in a runtime design for an integrated circuit (IC) by evaluating metadata of the runtime design. The IP core specifies a circuit configured for implementation in programmable circuitry of the IC. The method can include automatically retrieving source code for the IP core based on source data read from the metadata, generating a new instance of the IP core including the source code in a memory, and including the new instance of the IP core within a new compile time design.

A system includes one or more processors configured to initiate operations. The operations can include determining an IP core included in a runtime design for an IC by evaluating metadata of the runtime design. The IP core specifies a circuit configured for implementation in programmable circuitry of the IC. The operations can include automatically retrieving source code for the IP core based on source data read from the metadata, generating a new instance of the IP core including the source code in a memory, and including the new instance of the IP core within a new compile time design.

A computer program product includes one or more computer readable storage media, and program instructions collectively stored on the one or more computer readable storage media. The program instructions are executable by computer hardware to initiate operations. The operations can include determining an IP core included in a runtime design for an IC by evaluating metadata of the runtime design. The IP core specifies a circuit configured for implementation in programmable circuitry of the IC. The operations can include automatically retrieving source code for the IP core based on source data read from the metadata, generating a new instance of the IP core including the source code in a memory, and including the new instance of the IP core within a new compile time design.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

This disclosure relates to integrated circuits (ICs) and, more particularly, to rebuilding an Intellectual Property (IP) core based on a runtime design for an IC. In accordance with the inventive arrangements described within this disclosure, a design for an IC, e.g., a circuit design, may be generated that includes metadata that may be used to reimplement one or more IP cores contained in the design. The reimplemented IP core(s) may be used in a different context than was the case with the design from which the IP core(s) were extracted. A design that has been processed through a design flow and is in a state where the design may be loaded into an IC is referred to as a "runtime design." A design that is in a state that requires further compilation or processing through a design flow is referred to as a "compile time design." The term "design flow" refers to circuit design operations such as synthesis, placement, routing, and/or configuration bitstream generation.

In the usual case, runtime designs do not include the necessary information that allows one to extract a particular IP core from the runtime design and reimplement the IP core in a same or different context. There are any number of reasons why one may wish to reimplement an IP core from a runtime design. For example, after using an IP core included in a configuration bitstream of a runtime design for an IC, a user may wish to reproduce the IP core for use in a design targeted to a different environment (e.g., a different circuit board and/or a different IC). In another example, after a new Electronic Design Automation (EDA) system release, a user may wish to upgrade the runtime design including the IP core by rebuilding the existing design using the updated or new EDA system. In another example, after observing a bug in the runtime design, a user may wish to extract the IP core for further testing in a unit-test environment. In still another example, after not achieving a performance goal, a user may wish to explore how an IP core from the runtime design performs when implemented in a higher performance IC.

In the various example contexts described herein, certain implementation details for the IP core are required that are not included in, or available from, the runtime design itself. In accordance with the inventive arrangements described within this disclosure, circuit design methods, systems, and computer-program products are provided that facilitate reimplementation of IP cores as identified within, and extracted from, runtime designs. Metadata may be included in a runtime design to facilitate the reimplementation of one or more of the IP cores included in the runtime design. The metadata may be used by various implementation tools to extract the IP core, configure the IP core for use in a same or different context, and/or include the IP core in a design.

Figure 1:
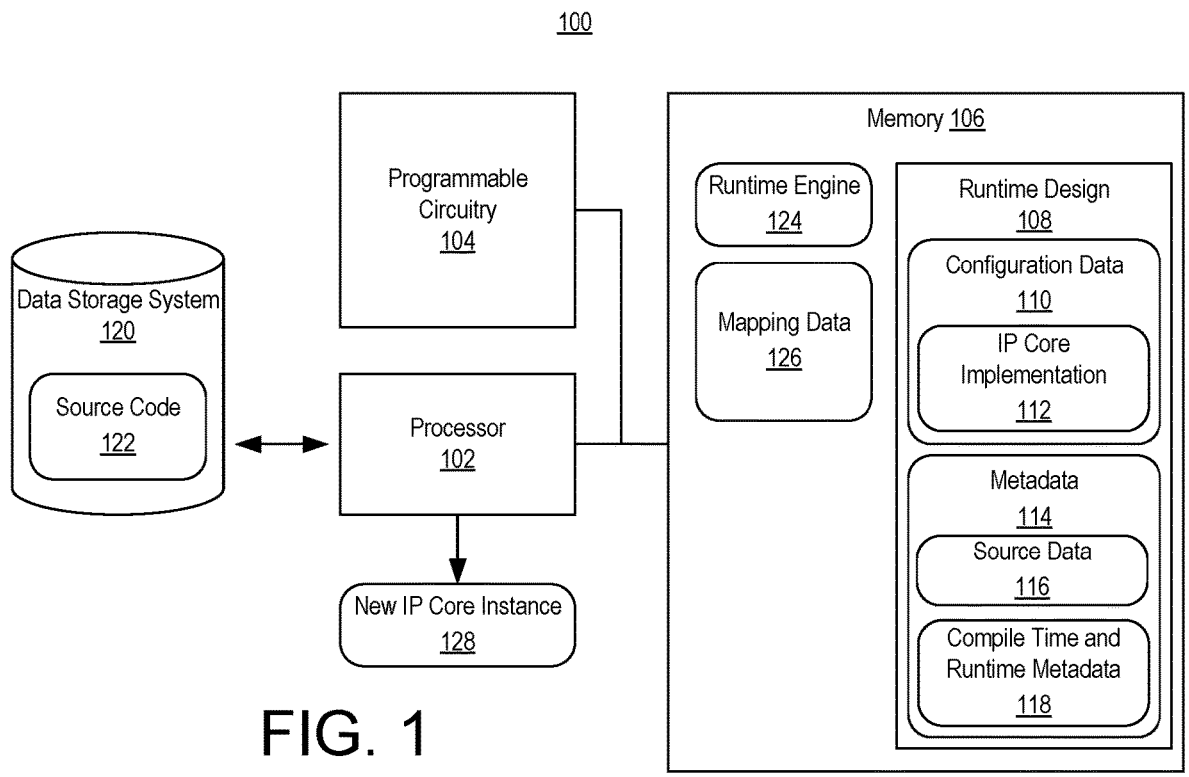
FIG. 1 illustrates an example data processing system for use with the inventive arrangements described herein.

FIG. 1 illustrates an example data processing system (system) 100 including a processor 102, programmable circuitry 104, and a memory 106. In an example implementation, system 100 may be implemented in an IC where the IC includes both processor 102 and programmable circuitry 104, with processor 102 coupled to programmable circuitry 104. Programmable circuitry 104 may include programmable logic and/or other types of circuitry that are configurable in the field. The IC may be disposed on a circuit board, e.g., a card. Memory 106 may be disposed on the same circuit board as the IC. An example IC including both a processor and programmable circuitry is described in connection with FIG. 7. An example implementation of system 100 may be an accelerator 630 as described in connection with FIG. 6 having an IC as described in connection with FIG. 7.

In another example implementation, system 100 may be implemented as a computer (e.g., sometimes referred to as a "host computer") coupled to an accelerator that includes an IC. In that case, processor 102 is included in the computer (e.g., as the central processing unit or "CPU") while programmable circuitry 104 is included in the IC. An example implementation of system 100 formed of a computer coupled to an accelerator is described in connection with FIG. 6.

Example ICs that may be used to implement programmable circuitry 104 and/or processor 102 may include, but are not limited to, Field Programmable Gate Arrays (FPGAs) and other ICs such as System-on-Chips (SoCs), and Application-Specific ICs (ASICs) that include at least some programmable circuitry. An IC that includes programmable circuitry that is included in system 100 when implemented using a computer may or may not include an embedded processor or processor system therein. From time-to-time within this disclosure, the term "programmable IC" may be used in reference to an IC that includes at least some programmable circuitry. Programmable circuitry may include programmable logic.

Referring again to FIG. 1, memory 106 includes a runtime design 108. As defined within this disclosure, the term "runtime design" refers to a file or files that include configuration data that, when loaded into an IC, implement circuitry in programmable circuitry of the IC. Runtime design 108 may be implemented or specified as a container file, where a container file is a file that includes one or more files therein.

In the example, runtime design 108 includes configuration data 110 and metadata 114. In one aspect, configuration data 110 may be implemented as one or more binary encoded files. For example, configuration data 110 may include one or more configuration bitstreams (e.g., partial and/or full) for a programmable IC. Configuration data 110 can include an implementation of an IP core shown as IP core implementation 112. IP core implementation 112, for example, may be included in, or specified as part of, the configuration bitstream. Configuration data 110 also may include one or more executables (not shown) that are executable by processor 102.

Metadata 114 includes source data 116. Source data 116 is data that indicates, to processor 102, how to retrieve source code of the IP core used to create IP core implementation 112. The source code may be retrieved from data storage system 120 or may be retrieved directly from metadata 114.

In an example, the source code for the IP core is embedded in runtime design 108 as part of metadata 114 itself. For example, source data 116 may be a string included in a field of metadata 114 that includes or specifies the actual source code from which IP core implementation 112 was derived.

In another example, source data 116 may be a pointer (e.g., address, network location, URL, etc.) stored in a field of metadata 114 that points to a location in data storage system 120. The pointer provides location information from which source code 122 for the IP core corresponding to IP core implementation 112 may be fetched or retrieved. Data storage system 120 may be remotely located from processor 102 and accessed via a network connection. In an example implementation, data storage system 120 may be part of a code management system. The code management system may be Web-based and may provide version control functions.

The "source code" for the IP core may be included in one or more design files for the IP core. The source code may include high-level programming language code in the case where the runtime design originates from a High-Level Synthesis (HLS) system or a block-level modeling system (e.g., MathWorks® of Natick, Mass.). The source code may include hardware description language (HDL) such as a register transfer level (RTL) description in the case where runtime design 108 originates in a hardware design tool. By making the original source file(s) for the IP core available, all necessary information for reimplementing the IP core is available to the tools and is accessible from runtime design 108 itself. Within this disclosure, the term "source code," in reference to an IP core, may refer to or include header files, full design files, compilation flags, and/or data that is executable or usable by an EDA system. The particular type of source code that is made available will depend on the origination of runtime design 108.

Compile time and runtime metadata 118 are different varieties of metadata 114. Runtime metadata are data items that are usable by processor 102 for communicating with IP core circuitry implemented in programmable circuitry 104 in consequence of loading configuration data 110 therein. Within this disclosure, the term "IP core circuitry" is used to refer to circuitry implemented in programmable circuitry 104 in consequence of loading configuration data 110, with IP core implementation 112 therein, into configuration memory of the IC including programmable circuitry 104. An example of runtime parameters includes a register map for communicating with IP core implementation 112 when implemented in programmable circuitry 104.

Compile time parameters are data items that are usable to reimplement the IP core from the source code from which IP core implementation 112 was generated. Compile time parameters may be used by an EDA system and/or a runtime engine 124, for example, to generate a new instance of the IP core from which IP core implementation 112 was created for inclusion in a different runtime design. Though shown separately, in one aspect, source data 116 may be considered compile time metadata.

In the example, memory 106 may store runtime engine 124 that is executable by processor 102. Processor 102 is capable of executing runtime engine 124 to process runtime designs stored in memory 106. In executing runtime engine 124, processor 102 is capable of extracting configuration data 110 from runtime design 108 and loading configuration data 110 into configuration memory (not shown) for programmable circuitry 104, thereby implementing the IP core circuitry within programmable circuitry 104.

Memory 106 may also include mapping data 126. Mapping data 126 may include a mapping of various items (e.g., parameters) of compile time metadata to commands executable by an EDA system. Processor 102, in executing runtime engine 124, in response to a request to extract an IP core corresponding to IP core implementation 112 from runtime design 108, is capable of analyzing runtime design 108 and determining compile time metadata from metadata 114 corresponding to IP core implementation 112. For example, runtime engine 124 is capable of obtaining source code directly from source data 116 if available therein or obtaining source code 122 using the pointer stored as source data 116. In either case, processor 102 obtains the source code for the selected IP core and obtains the compile time metadata for the IP core. Processor 102, in executing runtime engine 124, is capable of generating a new instance of the requested (or selected) IP core as new IP core instance 128. New IP core instance 128 includes the source code and the compile time metadata.

In one aspect, new IP core instance 128 may be parameterized, at least in part, based on the compile time metadata extracted from runtime design 108. Though parameterized, at least in part, a user may override the parameterization or certain parameters. Further, certain parameters of new IP core instance 128 may be generated by an EDA system when included in another design and/or context. Further aspects of parameterization of new IP core instance 128 are described in connection with FIG. 4.

Figure 2:
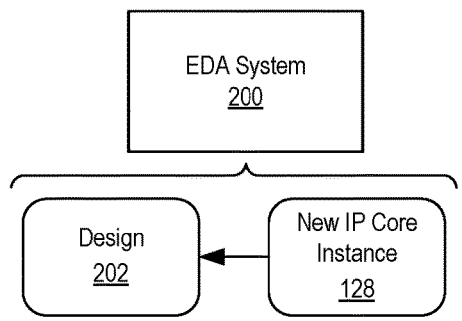
FIG. 2 illustrates an Electronic Design Automation (EDA) system receiving a new instance of an Intellectual Property (IP) core and incorporating the new instance of the IP core into a design.

FIG. 2 illustrates an example where an EDA system 200 receives new IP core instance 128 from runtime engine 124 and incorporates new IP core instance 128 into a design 202. Design 202 may be a new compile time design. EDA system 200 is capable of adjusting or setting one or more of the parameters of new IP core instance 128 based on received user input and/or the compile time metadata extracted from runtime design 108. Further, EDA system 200 is capable of adjusting one or more parameters of new IP core instance 128 based on design 202 and/or the context in which design 202 is to be used.

For example, certain parameters such as the base address for the register map of new IP core instance 128 may differ from the implementation in runtime design 108 based on whether design 202 is different from the prior design (e.g., of FIG. 1) and/or the particular target IC and/or circuit board for which design 202 is being implemented (e.g., where different from the example of FIG. 1). These types of parameters may be set by operation of EDA system 200 based on the new compile time design shown as design 202 as opposed to being determined from, or based on, compile time metadata extracted from runtime design 108.

Figure 3:
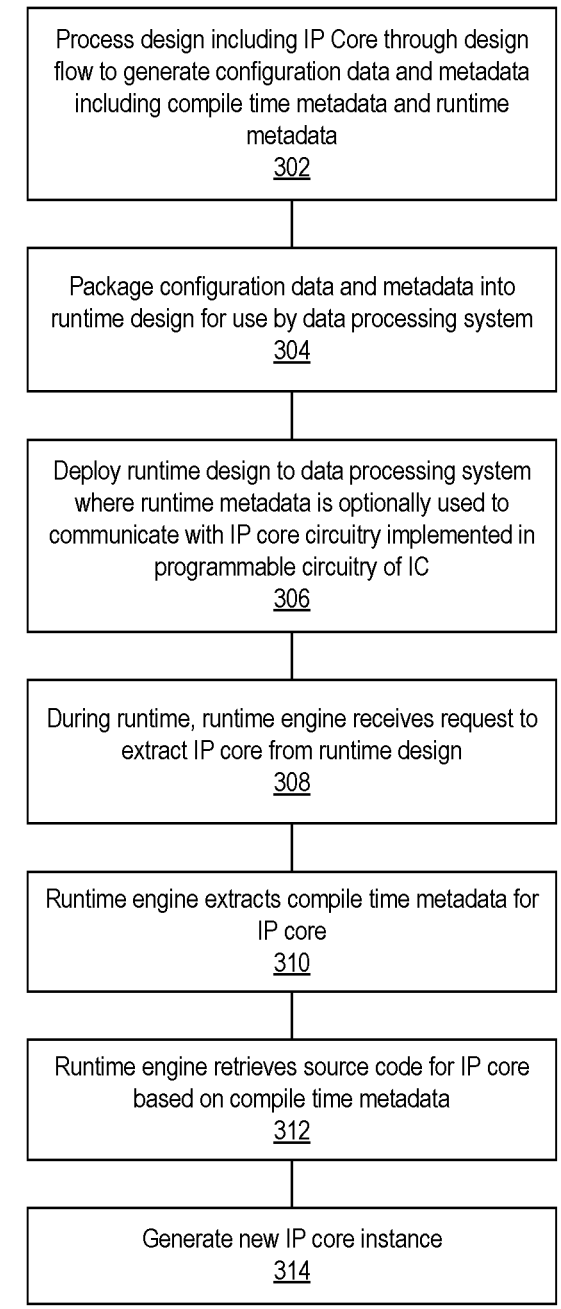
FIG. 3 illustrates an example method of extracting an IP core from a runtime design.

FIG. 3 illustrates an example method 300 of extracting an IP core from a runtime design. Method 300 may begin in block 302 where EDA system 200 is capable of processing a design including an IP core through a design flow to generate configuration data 110 and metadata 114. Configuration data 110 may include one or more configuration bitstreams. Configuration data 110 may also include one or more executables. The executables may be applications that are executable by processor 102 and/or drivers that are executable by processor 102 to access the IP core circuitry when implemented in programmable circuitry 104.

Metadata 114 may include runtime metadata and compile time metadata. The runtime metadata may include one or more parameters used by processor 102 to communicate with the IP core circuitry that will be implemented in programmable circuitry 104. Examples of runtime metadata may include, but are not limited to, a register map specifying control registers, interrupts, inputs, and outputs of IP core implementation 112 in the IP core circuitry. Runtime metadata may also include a list of one or more software drivers used to communicate with the IP core implementation 112 in the IP core circuitry. The executable for the driver may be included within configuration data 110.

Examples of compile time metadata may include, but are not limited to, a parameterization of the IP core used to generate IP core implementation 112 and any configurable settings of EDA system 200 in effect while generating configuration data 110. The compile time metadata may include a list of parameter values used to parameterize the IP core. The one or more parameter values assigned to parameters of the IP core constitute the parameterization of the IP core and may be used to reimplement the IP core. The compile time metadata may also include other parameter values generated automatically by EDA system 200 in performing the design flow on the design including the IP core.

Other examples of compile time metadata may include, but are not limited to, design constraints applied to the IP core when compiled (e.g., timing and/or power constraints), the particular version of the tool (e.g., EDA system 200) used to compile or implement the IP core, compiler directives and/or other settings in effect in EDA system 200 during compilation of the IP core, and the like.

As noted, the compile time metadata further includes source data for the IP core. As such, EDA system 200 may include source data 116 within metadata 114 that is generated.

In one or more example implementations, the source code 122 and/or source data 116 may be protected from unauthorized access by one or more security measures. For example, in the case where the source code is embedded in the compile time metadata, the source code may be encrypted or password protected such that runtime engine 124 must provide credentials to decrypt and/or gain access to the source code embedded therein. In another example, where source data 116 specifies a pointer to the source code, runtime engine 124 may provide proper credentials to read the source data 116 to retrieve source code 122. In still another example, source code 122, as stored in data storage system 120, may be encrypted or password protected. In that case, source data 116 may or may not be protected by a security measure. Retrieval of source code 122 from data storage system 120 may require proper credentials. Runtime engine 124 may provide the credentials to automatically retrieve source code 122 from data storage system 120. In one or more examples, runtime engine 124 may query the user that requested IP core extraction for the credentials needed to access source code 122 and/or source data 116.

Continuing with block 304, the EDA system 200 is capable of packaging configuration data 110 and metadata 114 into runtime design 108. The packaging described combines configuration data 110, which may include one or more configuration bitstreams and/or executables, and metadata 114 into runtime design 108, e.g., a container file, that may be handled by runtime engine 124 to facilitate loading of configuration data 110 into programmable circuitry 104 as may be required or controlled by processor 102. In generating runtime design 108, EDA system 200 is capable of applying any of the various security measures described herein to source data 116 included in metadata 114.

In block 306, runtime design 108 is deployed to system 100. Runtime design 108 may be provided from EDA system 200 and stored in memory 106 of system 100. Memory 106 may be a volatile memory or a non-volatile memory. With runtime design 108 having been deployed to system 100, runtime engine 124 is capable of loading configuration data 110 extracted from runtime design 108 into the IC to implement the IP core circuitry in programmable circuitry 104. In loading configuration data 110 into the IC, runtime engine 124, as executed by processor 102, may utilize runtime metadata to communicate with the IP core circuitry implemented in programmable circuitry 104. As noted, for example, the runtime metadata may include a memory map that provides processor 102 with address information to access control registers of the IP core circuitry, to provide data to the IP core circuitry, for retrieving data from the IP core circuitry, generating interrupts, and/or otherwise communicate with the IP core circuitry implemented in programmable circuitry 104.

In block 308, during operation, runtime engine 124 is capable of receiving a request to extract the IP core from runtime design 108. In one example, the request may specify the particular IP core included in configuration data 110 of runtime design 108. In another example, the request may be formatted as a query to identify one or more IP cores included in configuration data 110 of runtime design 108 that meet particular search criteria. Based on the querying performed by runtime engine 124 in response to the request, runtime engine 124 may select the IP core from configuration data 110 that matches the search criteria.

In an example implementation, runtime engine 124 may implement a declarative interface allowing a user to specify the search criteria. A user may access the declarative interface through an Application Programming Interface (API). For example, a user may request a particular IP core based on licensing type or terms, based on age of the IP core, functionality, or the like. The API allows the user to request one or more IP cores of runtime design 108 that meet the provided criteria regardless of whether the IP cores originated from a modeling system, an HLS system, or a hardware design system.

In block 310, runtime engine 124 extracts the compile time metadata for the IP core determined in block 308. The compile time metadata for the IP core may include a parameterization used by EDA system 200 during block 302, for example, to parameterize the IP core as included in runtime design 108. Further, the compile time metadata includes source data 116.

In block 312, runtime engine 124 retrieves the source code for the IP core based on the compile time metadata. In an example implementation, if the source code is embedded in the runtime design, runtime engine 124 extracts the source code directly from metadata 114 of runtime design 108. In an example implementation where source data 116 is a pointer to source code 122 stored in data storage system 120, runtime engine 124 retrieves source code 122 for the IP core from data storage system 120 using the address extracted from runtime design 108. It should be appreciated that if source data 116 and/or source code 122 is protected by a security mechanism, runtime engine 124 may provide the necessary credentials. For example, runtime engine 124 may store the necessary credentials or query the user requesting IP core extraction for the credentials to use to access source data 116 and/or source code 122.

In block 314, runtime engine 124 is capable of generating the new IP core instance 128. The new IP core instance 128 includes the source code and compile time metadata extracted from runtime design 108. The new IP core instance may be generated as a data object in memory, as a container file, or another data structure.

In one or more example implementations, the compile time metadata is translated into one or more commands that are executable by EDA system 200 to parameterize new IP core instance 128. A system, e.g., runtime engine 124 or EDA system 200, is capable of translating the compile time metadata extracted from runtime design 108 into one or more commands for EDA system 200. The translation may be performed using mapping data 126. The commands that are generated may be included in a script that may be provided to EDA system 200 with new IP core instance 128 or provided to EDA system 200 as part of new IP core instance 128.

Accordingly, in an example implementation, runtime engine 124 is capable of invoking EDA system 200 and providing new IP core instance 128 and the generated commands to EDA system 200. EDA system 200 is capable of executing the commands thereby parameterizing new IP core instance 128.

EDA system 200 is capable of incorporating new IP core instance 128 into a new compile time design, e.g., design 202. Design 202 may be for the same or different IC as runtime design 108. Accordingly, new IP core instance 128, as part of design 202, may undergo another design flow as performed by EDA system 200. In implementing design 202, EDA system 200 is capable of generating new configuration data and new metadata. EDA system 200 may combine the new configuration data and the new metadata into a new runtime design that may be deployed to system 100 or a new or different system. The new metadata that is generated includes both new runtime metadata and new compile time metadata thereby enabling subsequent extraction of the new IP core instance 128.

Figure 4:
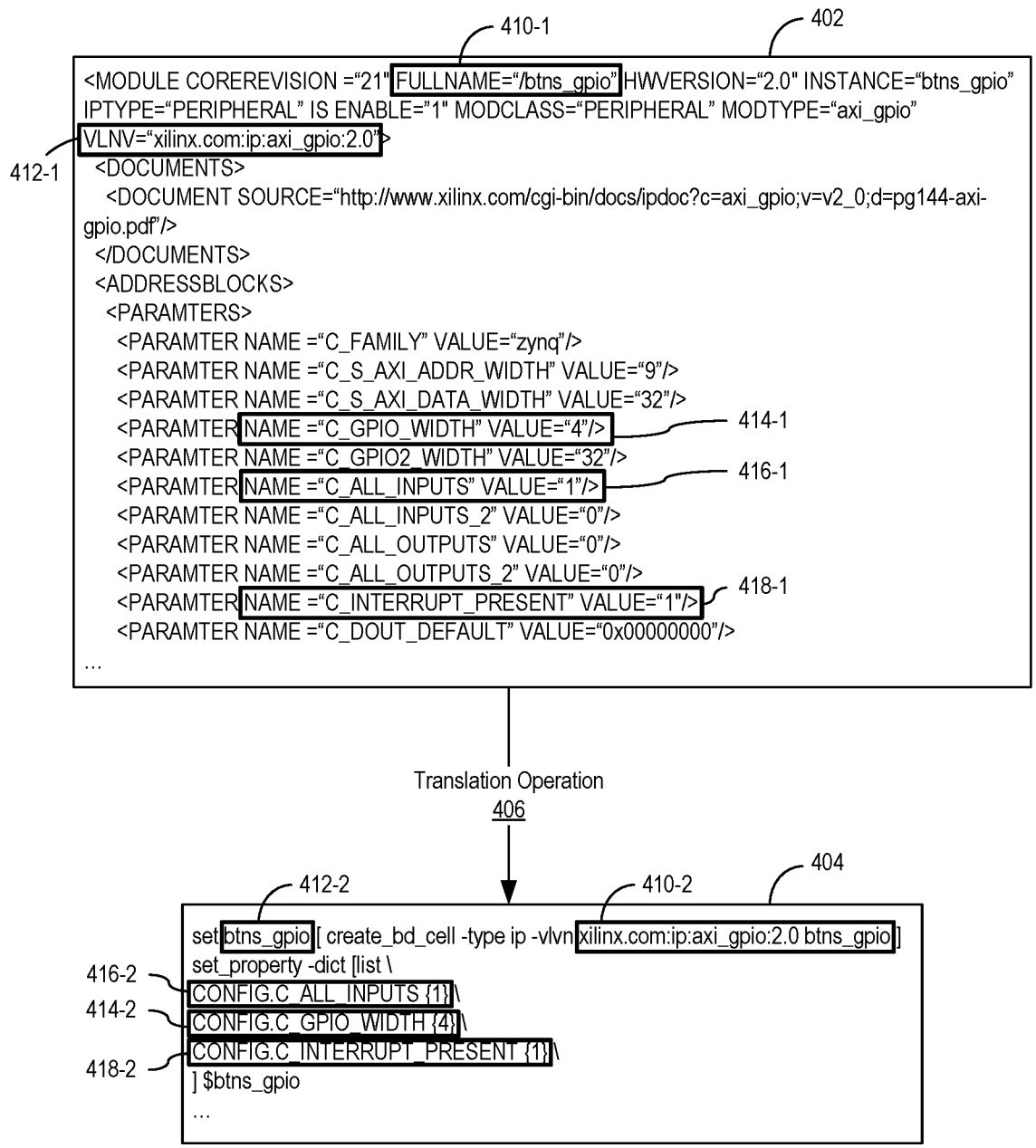
FIG. 4 illustrates an example translation operation.

FIG. 4 illustrates an example translation operation. FIG. 4 illustrates an example in which compile time metadata 402 extracted from a runtime design is translated, via a translation operation 406, into commands 404 for EDA system 200. In an example implementation, translation operation 406 is performed by runtime engine 124. In another example implementation, translation operation 406 is performed by EDA system 200.

In the example of FIG. 4, commands 404 may be specified using the Tcl scripting language. It should be appreciated that the commands may be specified in any of a variety of other formats and/or languages that are understandable and executable by EDA system 200. In this regard, the particular format and/or language of commands 404 is not intended as a limitation.

In the example of FIG. 4, parameters 410-1, 412-1, 414-1, 416-1, and 418-1 of compile time metadata 402 are translated into commands 410-2, 412-2, 414-2, 416-2, and 418-2, respectively, of commands 404. Translation operation 406 uses mapping data 126 to translate IP core parameters from compile time metadata 402 into commands 404. In one aspect, translation operation 406 need not generate commands for parameters on a one-to-one basis for the new IP core instance 128. For example, in cases where the parameter value of the IP core that is included in compile time metadata 402 is a default value for the IP core, translation operation 406 need not generate a command to set that parameter. Thus, commands 404 need only include commands to set parameter values for parameters taking non-default values. In that case, translation operation 406 may include detecting those parameters of the IP core that have default values in compile time metadata 402 and disregarding such parameters. It should be appreciated, however, that in other example implementations, translation operation 406 may generate a command to set each parameter of the IP core including those with default values since overwriting the default value of a parameter with the same default value will still result in a correct IP core implementation.

In other cases, translation operation 406 need not generate commands to set values for parameters of the IP core that will be automatically adjusted or changed as a consequence of EDA system 200 performing a design flow. Certain parameters, for example, may depend on the particular target IC and/or acceleration platform in which the IP core is to be used. The base address of a register map, for example, may be set by EDA system 200 during the implementation flow. In such cases, translation operation 406 need not generate commands to set such data since EDA system 200 will do so automatically in consequence of performing the design flow.

In another example, the particular type of IC in which the design is to be implemented not be known until EDA system 200 begins performing a design flow for a particular target IC. In that case, EDA system 200 may update new IP core instance 128 during the design flow with parameter values specifying the target IC.

Figure 5:
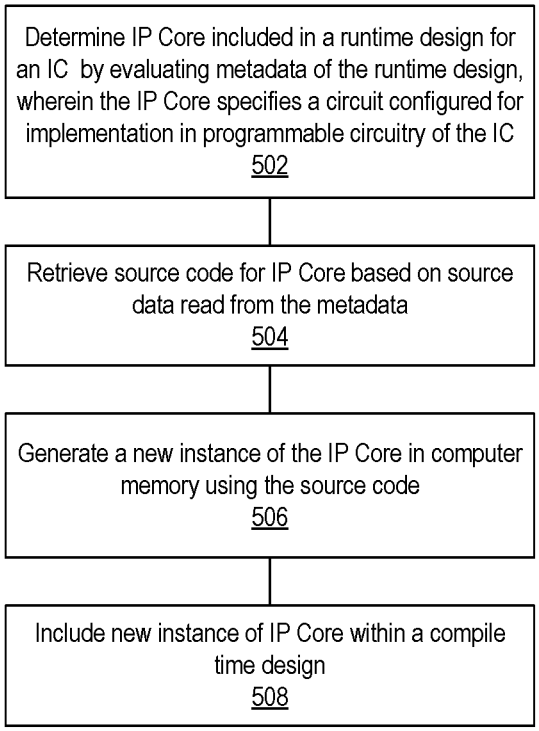
FIG. 5 illustrates an example method of reimplementing an IP core as extracted from a runtime design.
Figure 6:
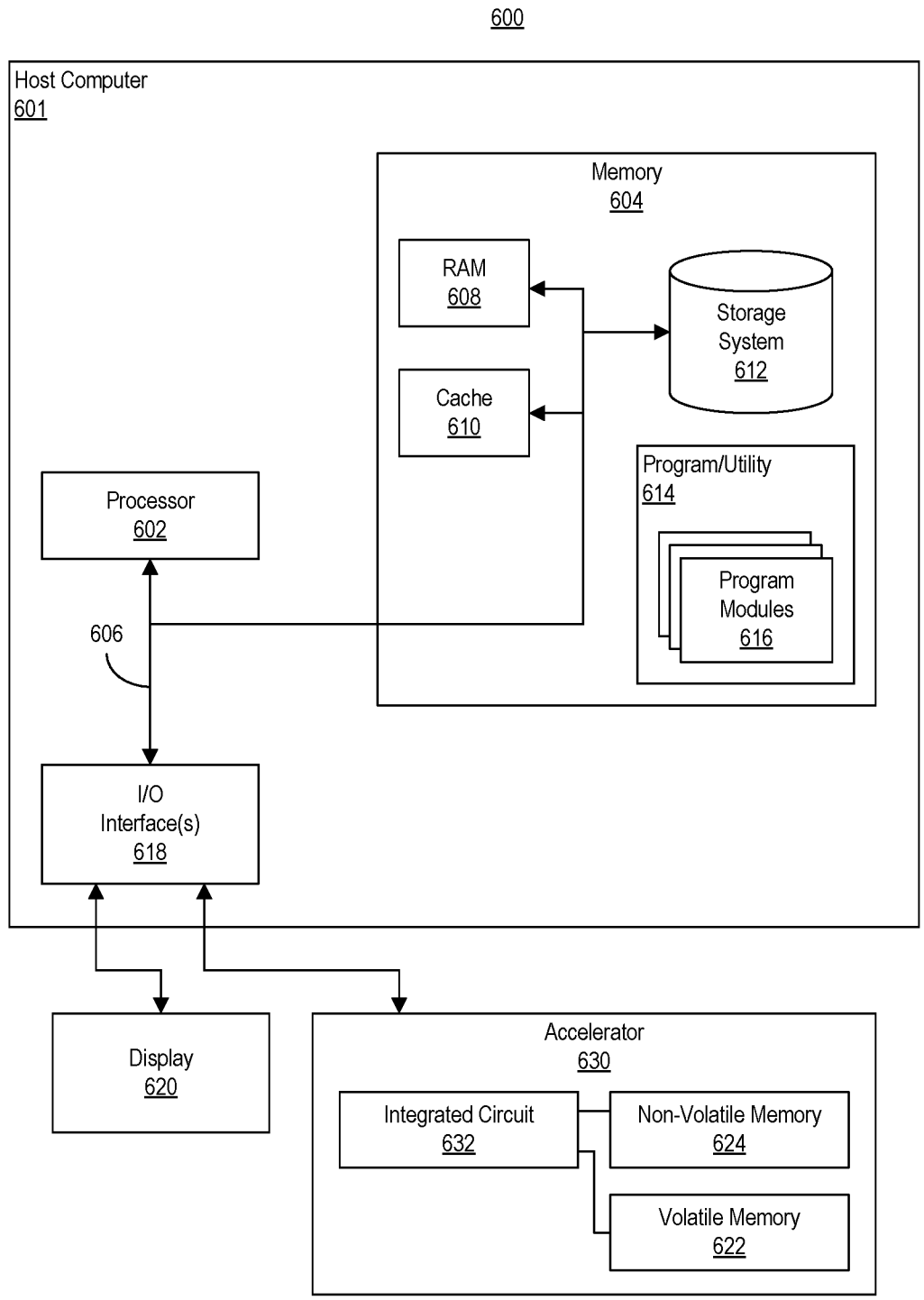
FIG. 6 illustrates an example data processing system including a processor and an IC.
Figure 7:
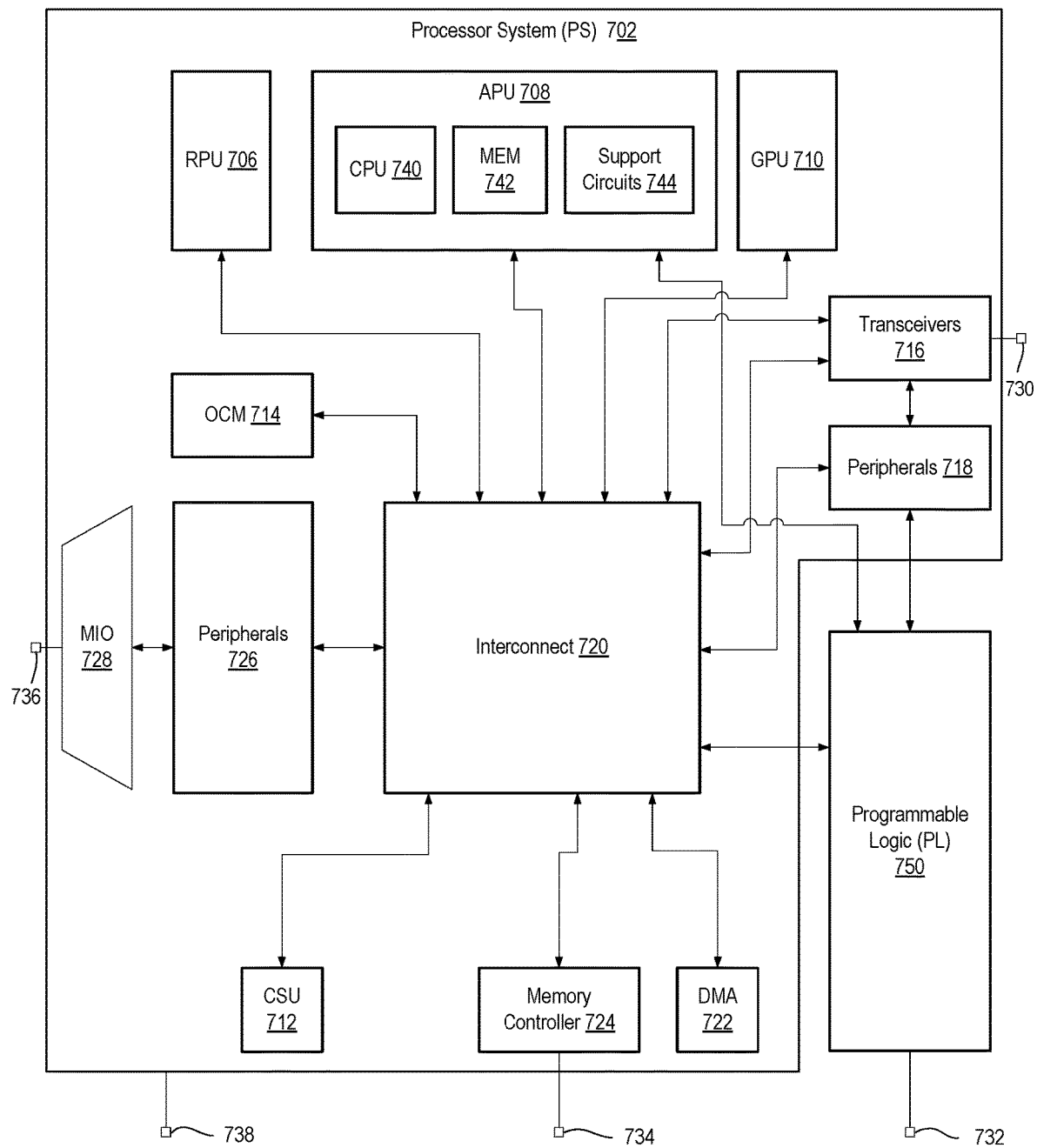
FIG. 7 illustrates an example architecture for an IC having an embedded processor.

FIG. 5 illustrates an example method 500 of reimplementing an IP core as extracted from a runtime design. Method 500 may begin in block 502 where processor 102 is capable of determining an IP core included in a runtime design 108 for an IC by evaluating metadata 114 of runtime design 108. For example, processor 102 is capable of receiving a request to extract an IP core from the runtime design as described in connection with FIG. 3. The IP core specifies a circuit implemented in programmable circuitry of the IC (e.g., IP circuitry). In block 504, processor 102 is capable of retrieving source code for the IP core based on source data 116 read from the metadata 114. In block 506, processor 102 is capable of generating a new instance of the IP core (e.g., new IP core instance 128) including the source code in a memory. That is, the new IP core instance 128 may be generated and stored in a memory device. In an example where processor 102 is included in the IC as illustrated in FIG. 7 (e.g., as or in APU 708), the memory may be volatile memory 622 as shown in FIG. 6 or an on-chip memory if available in the IC. The new IP core instance 128 may then be provided to another computing system for further use. In an example where processor 102 is implemented as processor 602 in host computer 601, the memory may be memory 604. In block 508, the new IP core instance 128 may be included in a new compile time design. For example, EDA system 200 may include new IP core instance 128 in the new compile time design (e.g., design 202). The new compile time design may be a new circuit design or updated version of the prior circuit design whether intended for the same IC or a different IC.

The foregoing and other implementations can each optionally include one or more of the following features, alone or in combination. Some example implementations include all the following features in combination.

In one aspect, processor 102 is capable of determining a parameterization of the IP core used in the runtime design 108 from the metadata 114. The new IP core instance 128 may be parameterized using, at least in part, the parameterization. In another aspect, the new IP core instance 128 may be parameterized, at least in part, based on the new compile time design.

The parameterization may be performed by processor 102 or by EDA system 200. In an example implementation, the parameterization may be performed by translating the parameterization of the IP core into one or more commands for EDA system 200 as illustrated in the example of FIG. 4.

The metadata may include runtime metadata used by processor 102 to communicate with the circuit implemented in the programmable circuitry of the IC.

In one aspect, the source data read from the metadata may include the source code. In another aspect, the source code is retrieved from a data storage system using location data included in the source data. The source code, whether included in the metadata 114 (e.g., as the source data) or in the data storage system, may be protected by a security measure. The security measure may be encryption and/or password protection. Password protection may include storage in a secure area (e.g., of the data storage system or in metadata 114) that may only be accessed by users having the required credentials.

FIG. 6 illustrates an example data processing system 600 including a processor and an IC. In the example of FIG. 6, data processing system 600 includes a host computer 601 coupled to an accelerator 630 via communication link.

Host computer 601 can be practiced as a standalone device, as a bare metal server, in a cluster (e.g., two or more interconnected computers), or in a distributed cloud computing environment where tasks are performed by remote processing devices that are linked through a communications network. In a distributed cloud computing environment, program modules may be located in both local and remote computer system storage media including memory storage devices.

As shown in FIG. 6, the components of host computer 601 can include, but are not limited to, a processor 602, a memory 604, and a bus 606 that couples various system components including memory 604 to processor 602. Processor 602 may be implemented as one or more processors. In an example, processor 602 is implemented as a CPU.

Example processor types include, but are not limited to, processors having an x86 type of architecture (IA-32, IA-64, etc.), Power Architecture, ARM processors, and the like. In the example, memory 106 of FIG. 1 corresponds to memory 604 and processor 102 of FIG. 1 corresponds to processor 602.

Bus 606 represents one or more of any of a variety of communication bus structures. By way of example, and not limitation, bus 606 may be implemented as a Peripheral Component Interconnect Express (PCIe) bus. Host computer 601 typically includes a variety of computer system readable media. Such media may include computer-readable volatile and non-volatile media and computer-readable removable and non-removable media.

In the example of FIG. 6, host computer 601 includes memory 604. Memory 604 can include computer-readable media in the form of volatile memory, such as random-access memory (RAM) 608 and/or cache memory 610. Host computer 601 can also include other removable/non-removable, volatile/non-volatile computer storage media. By way of example, storage system 612 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 606 by one or more data media interfaces. Memory 604 is an example of at least one computer program product.

Program/utility 614, having a set (at least one) of program modules 616, may be stored in memory 604. By way of example, program modules 616 may represent an operating system, one or more application programs, other program modules, and program data. Program modules 616 generally carry out the functions and/or methodologies of the example implementations described within this disclosure. For example, one or more of program modules 616 can implement runtime engine 124. Program/utility 614 is executable by processor 602. Program/utility 614 and any data items used, generated, and/or operated upon by host computer 601 are functional data structures that impart functionality when employed by host computer 601.

Host computer 601 may include one or more Input/Output (I/O) interfaces 618 communicatively linked to bus 606. I/O interface(s) 618 allow host computer 601 to communicate with external devices, couple to external devices that allow user(s) to interact with host computer 601, couple to external devices that allow host computer 601 to communicate with other computing devices, and the like. For example, host computer 601 may be communicatively linked to a display 620 and to accelerator 630 through I/O interface(s) 618. Host computer 601 may be coupled to other external devices such as a keyboard (not shown) via I/O interface(s) 618. Examples of I/O interfaces 618 may include, but are not limited to, network cards, modems, network adapters, hardware controllers, etc.

In an example implementation, the I/O interface 618 through which host computer 601 communicates with accelerator 630 is a PCIe adapter where host computer 601 communicates with accelerator 630 over a PCIe communication channel. Accelerator 630 may be implemented as a circuit board that couples to host computer 601. Accelerator 630 may, for example, be inserted into a card slot, e.g., an available bus and/or PCIe slot, of host computer 601.

Accelerator 630 includes IC 632. Accelerator 630 also includes volatile memory 622 coupled to IC 632 and a non-volatile memory 624 also coupled to IC 632. Volatile memory 622 may be implemented as a RAM. In the example of FIG. 6, volatile memory 622 is external to IC 632, but is still considered a "local memory" of IC 632, whereas memory 604, being within host computer 601, is not considered local to IC 632. Non-volatile memory 624 may be implemented as flash memory. Non-volatile memory 624 is also external to IC 632 and may be considered local to IC 632. IC 632 includes programmable circuitry 104.

Host computer 601 is only one example implementation of a computer. Host computer 601 may be used in a standalone capacity, e.g., as a user computing device or a server, as part of a computing cluster (e.g., two or more interconnected computers), or as a cloud computing node. The example of FIG. 6 is not intended to suggest any limitation as to the scope of use or functionality of example implementations described herein. Host computer 601 is an example of computer hardware that is capable of performing the various operations described within this disclosure.

In this regard, host computer 601 may include fewer components than shown or additional components not illustrated in FIG. 6 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Some computing environments, e.g., cloud computing environments and/or edge computing environments using host computer 601 or other suitable data processing system, generally support the FPGA-as-a-Service (FaaS) model. In the FaaS model, user functions are hardware accelerated as circuit designs implemented within programmable ICs operating under control of the (host) data processing systems. Other examples of cloud computing models are described in the National Institute of Standards and Technology (NIST) and, more particularly, the Information Technology Laboratory of NIST.

Host computer 601 is also an example implementation of EDA system 200. Program modules 616, for example, may include software that is capable of performing an implementation flow on a circuit design or portion thereof and performing operations relating to generating a runtime design. In this regard, host computer 601 serves as an example of an EDA system that is capable of processing circuit designs and/or generating configuration data for IC 632 as described herein. It should be appreciated that FIG. 6 is provided as an example and that EDA system 200 may be implemented in a different computer than host computer 601.

FIG. 7 illustrates an example architecture for an IC 700. IC 700 is an example of a System-on-Chip (SoC) type of IC. In the example of FIG. 7, IC 700 is implemented on a single die provided within a single package. In other examples, IC 700 may be implemented using a plurality of interconnected dies within a single package where the various resources of IC 700 (e.g., circuits) illustrated in FIG. 7 are implemented across the different interconnected dies. IC 700 may include one or more different types of subsystems.

In the example, IC 700 includes a processor system (PS) 702. While described as a "system," PS 702 is an example of a subsystem of IC 700. In general, PS 702 is implemented as hardwired circuitry that is fabricated as part of IC 700. PS 702 may be implemented as, or include, any of a variety of different processor types each capable of executing program code. The processors may have different architectures and/or instruction sets.

In the example, PS 702 includes various processors such as a real-time processing unit (RPU) 706, an application processing unit (APU) 708, a graphics processing unit (GPU) 710, a configuration and security unit (CSU) 712, and the like. Each of the processors is capable of executing program code. In one example, PS 702 may implement processor 102. That is, processor 102 may be implemented by one or more of the processors within PS 702. In another example, APU 708 may be used to implement processor 102.

PS 702 also includes various support circuits, such as on-chip memory (OCM) 714, transceivers 716, peripherals 718, interconnect 720, DMA circuit 722, memory controller 724, peripherals 726, and multiplexed input/output (MIO) circuit 728. The processors and the support circuits are interconnected by interconnect 720.

Transceivers 716 may be coupled to external pins 730. Programmable logic (PL) 750, to be described in greater detail below, may be coupled to external pins 732. Memory controller 724 may be coupled to external pins 734. MIO 728 may be coupled to external pins 736. PS 702 may be coupled to external pins 738. APU 708 can include a CPU 740, memory 742, and support circuits 744.

In the example of FIG. 7, each of processors 706, 708, and 710 may include one or more central processing units (CPUs) and associated circuits, such as memories, interrupt controllers, direct memory access (DMA) controllers, memory management units (MMUs), floating point units (FPUs), and the like. Interconnect 720 includes various switches, busses, communication links, and the like configured to interconnect processors 706, 708, 710 and to interconnect the other components in PS 702 to processors 706, 708, and 710.

OCM 714 includes one or more RAM modules, which can be distributed throughout PS 702. For example, OCM 714 can include battery backed RAM (BBRAM), tightly coupled memory (TCM), and the like. Memory controller 724 can include a dynamic random-access memory (DRAM) interface for accessing external DRAM. Peripherals 718, 726 can include one or more components that provide an interface to PS 702. For example, peripherals can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose IO (GPIO) ports, serial advanced technology attachment (SATA) ports, PCIe ports, and the like. Peripherals 726 can be coupled to MIO 728. Peripherals 718 can be coupled to transceivers 716. Transceivers 716 can include serializer/deserializer (SERDES) circuits, MGTs, and the like.

In the example of FIG. 7, IC 700 includes a PL 750 subsystem. PL 750 is circuitry that may be programmed to perform specified functions. As an example, PL 750 may be implemented as field programmable gate array type of circuitry. PL 750 can include an array of programmable circuit blocks. As defined herein, the term "programmable logic" means circuitry used to build reconfigurable digital circuits. Programmable logic is formed of many programmable circuit blocks that provide basic functionality. PL 750 may implement programmable circuitry 104 of FIG. 1.

In the example of FIG. 7, PL 750 may be coupled to interconnect 720. The topology of PL 750 is highly configurable unlike hardwired circuitry. Each programmable circuit block of PL 750 typically includes a programmable element (e.g., a functional element) and a programmable interconnect. The programmable interconnects provide the highly configurable topology of PL 750. The programmable interconnects may be configured on a per wire basis to provide connectivity among the programmable elements of programmable circuit blocks of PL 750 and is configurable on a per-bit basis (e.g., where each wire conveys a single bit of information) unlike packet-based communications, for example.

Examples of programmable circuit blocks of PL 750 include configurable logic blocks having look-up tables and registers. Unlike hardwired circuitry, these programmable circuit blocks have an undefined function at the time of manufacture. PL 750 may include other types of programmable circuit blocks that also provide basic and defined functionality with more limited programmability. Examples of these circuit blocks may include digital signal processing blocks (DSPs), phase lock loops (PLLs), and block random access memories (BRAMs). These types of programmable circuit blocks, like others in PL 750, are numerous and intermingled with the other programmable circuit blocks of PL 750. These circuit blocks may also have an architecture that generally includes a programmable interconnect and a programmable element and, as such, are part of the highly configurable topology of PL 750.

Prior to use, PL 750, e.g., the programmable interconnect and the programmable elements, must be programmed or "configured" by loading data referred to as a configuration bitstream into internal configuration memory cells therein. The configuration memory cells, once loaded with a configuration bitstream, define how PL 750 is configured, e.g., the topology, and operates (e.g., particular functions performed). Within this disclosure, a "configuration bitstream" is not equivalent to program code executable by a processor or computer.

IC 700 may include one or more other subsystems including a processor array (e.g., a data processing engine (DPE) array), a Network-on-Chip (NoC), a platform management controller (PMC), and one or more hardwired circuit blocks. A DPE array and a NoC are considered additional examples of programmable circuitry though not considered programmable logic.

A hardwired circuit block refers to a special-purpose circuit block fabricated as part of IC 700. Though hardwired, hardwired circuit blocks may be configured by loading configuration data into control registers to implement one or more different modes of operation therein. Examples of hardwired circuit blocks may include input/output (I/O) blocks, transceivers for sending and receiving signals to circuits and/or systems external to IC 700, memory controllers, or the like. Examples of different I/O blocks may include single-ended and pseudo differential I/Os. Examples of transceivers may include high-speed differentially clocked transceivers. Other examples of hardwired circuit blocks include, but are not limited to, cryptographic engines, digital-to-analog converters (DACs), analog-to-digital converters (ADCs), and the like. In general, hardwired circuit blocks are application-specific circuit blocks.

In the example of FIG. 7, IC 700 may be disposed on a circuit board such as accelerator 630 of FIG. 6. In that case, memory 106 of FIG. 1 may be implemented as volatile memory 622 of FIG. 6. In such an example implementation, accelerator 630 may be considered an example data processing system as described in connection with FIG. 1.

In one or more other example implementations, IC 632 of FIG. 6 may be implemented using an IC have an architecture the same as or similar to the architecture shown in FIG. 7. In cases where IC 632 is used in combination with a computer system as illustrated in FIG. 6, however, IC 632 may include one or more embedded processors or may not include any embedded processors.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, "data processing system" means one or more hardware systems configured to process data, each hardware system including at least one processor programmed to initiate operations and memory.

As defined herein, the term "processor" means at least one circuit capable of carrying out instructions contained in program code. The circuit may be an integrated circuit or embedded in an integrated circuit.

As defined herein, the term "output" means storing in physical memory elements, e.g., devices, writing to display or other peripheral output device, sending or transmitting to another system, exporting, or the like.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
determining an Intellectual Property (IP) core included in a runtime design for an integrated circuit by evaluating metadata of the runtime design, wherein the IP core specifies a circuit configured for implementation in programmable circuitry of the integrated circuit;
wherein the runtime design is loadable into the integrated circuit to implement circuitry within the programmable circuitry;
automatically retrieving source code for the IP core based on source data read from the metadata, wherein the source data includes source code of the IP core or specifies location data specifying a location of the source code of the IP core;
generating a new instance of the IP core, including the source code, in a memory; and
including the new instance of the IP core within a compile time design, wherein the compile time design requires compilation through a design flow for implementation in the integrated circuit.

2. The method of claim 1, comprising:
determining a parameterization of the IP core used in the runtime design from the metadata; and
parameterizing the new instance of the IP core using, at least in part, the parameterization.

3. The method of claim 2, comprising:
translating the parameterization of the IP core into one or more commands for an Electronic Design Automation (EDA) system; and
performing the parameterizing by executing the one or more commands using the EDA system.

4. The method of claim 2, comprising:
parameterizing the new instance of the IP core based, at least in part, on the compile time design.

5. The method of claim 2, wherein the metadata includes:
runtime metadata used by a processor to communicate with the circuit implemented in the programmable circuitry of the integrated circuit.

6. The method of claim 1, further comprising:
first storing the runtime design and the metadata within a host computer system communicatively linked to the integrated circuit.

7. The method of claim 1, wherein the automatically retrieving the source code further comprises:
reading the source code from the metadata; or
retrieving the source code from a data storage system using the location data included in the source data.

8. A system, comprising:
a processor configured to initiate operations including:
determining an Intellectual Property (IP) core included in a runtime design for an integrated circuit by evaluating metadata of the runtime design, wherein the IP core specifies a circuit configured for implementation in programmable circuitry of the integrated circuit;
wherein the runtime design is loadable into the integrated circuit to implement circuitry within the programmable circuitry;
automatically retrieving source code for the IP core based on source data read from the metadata, wherein the source data includes source code of the IP core or specifies location data specifying a location of the source code of the IP core;
generating a new instance of the IP core, including the source code, in a memory; and
including the new instance of the IP core within a compile time design, wherein the compile time design requires compilation through a design flow for implementation in the integrated circuit.

9. The system of claim 8, wherein the processor is configured to initiate operations comprising:
determining a parameterization of the IP core used in the runtime design from the metadata; and
parameterizing the new instance of the IP core using, at least in part, the parameterization.

10. The system of claim 9, wherein the processor is configured to initiate operations comprising:
translating the parameterization of the IP core into one or more commands for an Electronic Design Automation (EDA) system; and
performing the parameterizing by executing the one or more commands using the EDA system.

11. The system of claim 9, wherein the processor is configured to initiate operations comprising:
parameterizing the new instance of the IP core based, at least in part, on the compile time design.

12. The system of claim 9, wherein the metadata includes:
runtime metadata used by a processor to communicate with the circuit implemented in the programmable circuitry of the integrated circuit.

13. The system of claim 8, wherein the processor is configured to initiate operations comprising:
first storing the runtime design and the metadata within a host computer system communicatively linked to the integrated circuit.

14. The system of claim 8, wherein the automatically retrieving the source code further comprises:
reading the source code from the metadata; or
retrieving the source code from a data storage system using the location data included in the source data.

15. A computer program product, comprising:
one or more computer readable storage media, and program instructions collectively stored on the one or more computer readable storage media, wherein the program instructions are executable by computer hardware to initiate operations including:
determining an Intellectual Property (IP) core included in a runtime design for an integrated circuit by evaluating metadata of the runtime design, wherein the IP core specifies a circuit configured for implementation in programmable circuitry of the integrated circuit;
wherein the runtime design is loadable into the integrated circuit to implement circuitry within the programmable circuitry;
automatically retrieving source code for the IP core based on source data read from the metadata, wherein the source data includes source code of the IP core or specifies location data specifying a location of the source code of the IP core;
generating a new instance of the IP core, including the source code, in a memory; and
including the new instance of the IP core within a compile time design, wherein the compile time design requires compilation through a design flow for implementation in the integrated circuit.

16. The computer program product of claim 15, wherein the program instructions are executable by the computer hardware to initiate operations comprising:
determining a parameterization of the IP core used in the runtime design from the metadata; and
parameterizing the new instance of the IP core using, at least in part, the parameterization.

17. The computer program product of claim 16, wherein the program instructions are executable by the computer hardware to initiate operations comprising:
translating the parameterization of the IP core into one or more commands for an Electronic Design Automation (EDA) system; and
performing the parameterizing by executing the one or more commands using the EDA system.

18. The computer program product of claim 16, wherein the metadata includes:
runtime metadata used by a processor to communicate with the circuit implemented in the programmable circuitry of the integrated circuit.

19. The computer program product of claim 15, wherein the program instructions are executable by the computer hardware to initiate operations comprising:
first storing the runtime design and the metadata within a host computer system communicatively linked to the integrated circuit.

20. The computer program product of claim 15, wherein the automatically retrieving the source code further comprises:
reading the source code from the metadata; or
retrieving the source code from a data storage system using the location data included in the source data.

* * * * *